Nov. 11, 1969  W. C. WARTH ETAL  3,477,131

POSITION FIXING INSTRUMENT

Filed Oct. 14, 1966

INVENTORS
WILLIAM C. WARTH
ALFRED W. WARTH
BY Mann, Brown & McWilliams

ATTORNEYS

United States Patent Office 3,477,131
Patented Nov. 11, 1969

3,477,131
POSITION FIXING INSTRUMENT
William C. Warth, 3113 S. New York Ave., and Alfred W. Warth, 3111 S. New York Ave., both of Milwaukee, Wis. 53207
Filed Oct. 14, 1966, Ser. No. 586,789
Int. Cl. G01c 3/10, 17/02, 19/36
U.S. Cl. 33—66
2 Claims

ABSTRACT OF THE DISCLOSURE

A position fixing instrument with compass and relatively movable sighting tubes. From a divergence angle scale plate which supports the sighting tubes depends integrally a vertically elongated compass housing, and the cylindrical compass dial is so positioned at the end of a depending channel in the plate as to be readable from eye positions suitable also for sighting through both tubes.

Our invention relates to scopes, and more particularly to an adjustable scope for determining a definite location.

The prime object of our invention is to provide a simple and efficient device enabling a fix of a particular position.

It is manifest to anyone familiar with wide open terrain or water, that it is quite frequently desirable to establish a definite location to come back to at a later time. For example, when fishing on any body of water and a spot is reached where the fish are plentiful, one would like to get back to that same location at a later time. With the device described, illustrated and claimed herein, it is possible to peer through a lens to observe a compass and direction reading, while peering through two relatively adjustable scopes directed onto fixed objects on a shore line. By adjustably moving the scopes and directing them respectively onto two spaced and fixed objects on the shore line, while noting the compass reading, and angular relation of the scopes, a definite location is established that can be attained at a later time.

In other words, the relation of the two scopes, directed onto two fixed objects on the shore line, in combination with the compass reading, will determine the setting or location.

The device is simple in construction, and comparatively easy to operate without special mechanical skill.

Other and further objects of our invention will become more apparent as the description proceeds, when taken in conjunction with the accompanying drawings, in which.

Figure 1:
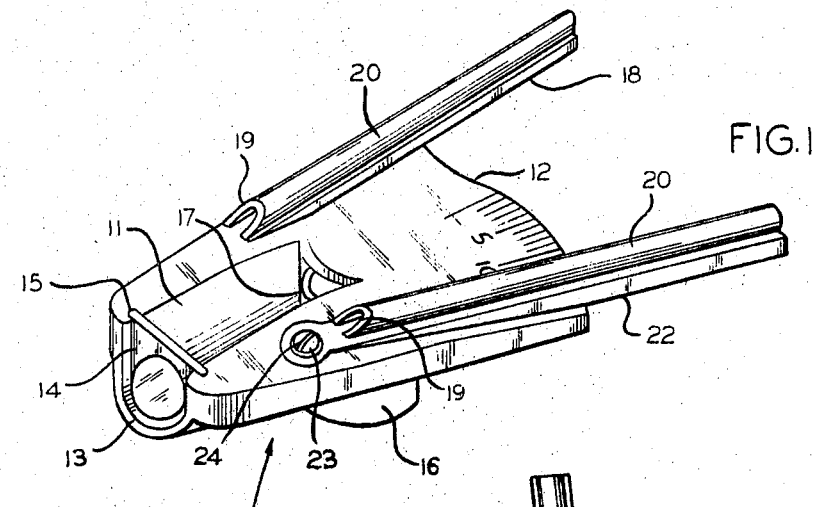
FIGURE 1 is a perspective view of the assembled device showing a lens, compass, stationary scope, and laterally adjustable scope.
Figure 3:
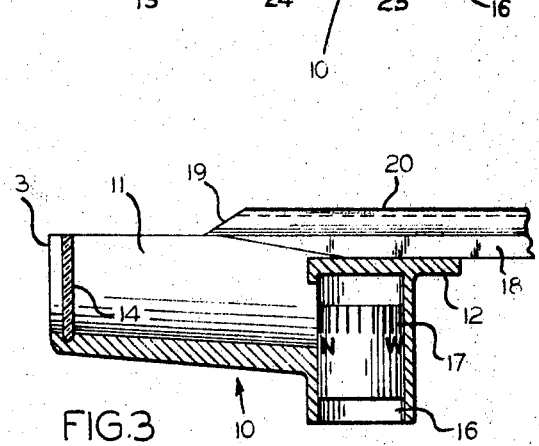
FIGURE 3 is a vertical cross sectional view of the assembled device, taken at the line 3—3, in FIGURE 2.

Similar characters of reference indicate corresponding parts and features throughout the several views, and referring specifically now to the same, the character 10 shows generally the body of the device having a U-shaped channel 11, horizontally disposed. A flat plate portion 12 is integrally constructed as part of the upper surface of the body 10.

The open forward end 13 of the channel 11 is provided with a lens 14, which is flat at its upper edge and supported within a groove 15 at one end of the body. The forward end of the channel 11 terminates in a depending cylindrical portion 16 for supporting a compass 17. The compass is preferably of a type having a generally cylindrical dial with the various degrees of direction printed on the outer face of the cylindrical dial. The magnets are carried by the dial to line up in a generally magnetic north and south position. The dial is so arranged that the direction reading faces the rear end of the unit so that a person viewing the compass dial through the lens 14 will thereby note the direction reading of the compass. It is preferred that the magnets of the compass be adjusted through a few degrees so that it gives a proper reading of the direction that the stationary scope 20 is facing. This may be accomplished by pointing the stationary scope in a true north direction and then angularly adjusting the magnets of the compass through the few degrees necessary to then have the compass reading which is viewed through lens 14 as 0° or north.

Figure 2:
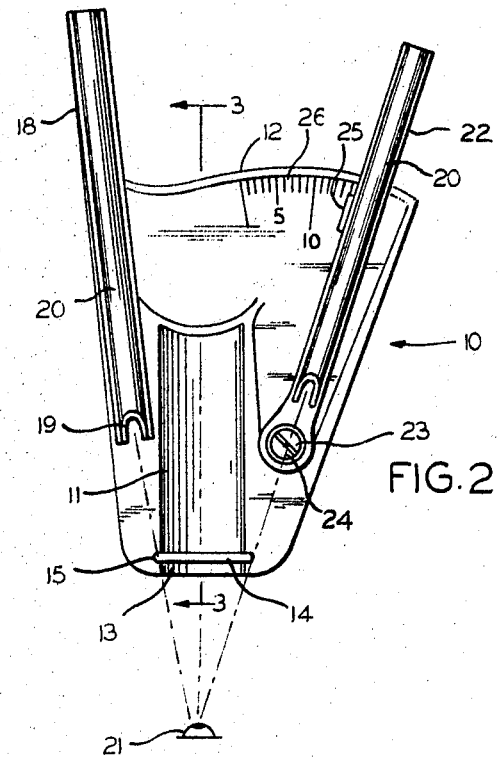
FIGURE 2 is a top, or plan view of the device shown in FIGURE 1.

The flat plate portion 12 rigidly supports a first sighting tube or scope 18, shown beveled at its rear end 19 and defined by a longitudinal tube 20. This scope 18 extends above the plate 12 and is disposed so that the eye of the user shown as 21 (see FIGURE 2) may sight therethrough while sighting the compass reading through lens 14.

There is another similar sighting tube or scope 22 mounted on the plate 12 in a pivoted fashion as at 23 and rotatably supported by a screw 24, or in any other practical, and efficient manner. This scope 22 slidably engages the upper surface of the plate 12, and has a member 25 on one edge thereof for registering with the numerically equipped indicator lines 26 of the upper surface of the plate 12.

Figure 4:
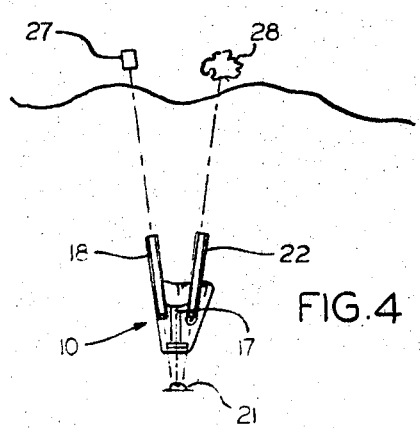
FIGURE 4 is a schematic plan of a fanciful space of water surface, having a pair of fixed objects shown on the shore line, and the device spaced centrally, as if in a boat while in use.

By referring to FIGURE 4, it will be noted that the device carried by the user in a boat, or the like, is supported by the user in a position where the eye of the user shown as 21, sights a first stationary object 27 on the shore line through the scope 18. He then adjusts the scope 22, so that another fixed object 28 may be sighted therethrough, at which time he notes the reading of the compass 17, and the position of the member 25 on the numerals 26 on the plate 12, so that at a later time when he reaches the same location on the pond or lake, he can set the unit according to his recorded reading of the compass, objects sighted and relative angular position of the scopes. He can later identify and return to the identical spot.

We claim:
1. Apparatus for enabling a fix of a position including a support having a substantially flat upper surface on a forward portion thereof and an upwardly open channel extending from a medial portion of said support to the rear thereof, a first elongated hollow sighting tube fixed to said upper surface, a second elongated hollow sighting tube pivotally mounted on said flat upper surface at a position spaced laterally from said first sighting tube, said second sighting tube being movable to provide different angular relations with respect to said first sighting tube, indicating means on said upper surface for indicating the angular position of said second sighting tube relative to said first sighting tube, said tubes having rearward ends positioned forwardly of the rear of said support, a compass supporting tube positioned on said support at an area of said support medially with respect to said sighting tubes and in depending relation to said tubes, a movable cylindrical compass direction indicating dial positioned within said supporting tube, said upwardly open channel extending rearwardly from said compass supporting tube and the rearward ends of said sighting tubes whereby the eye of the user may be positioned at the rearward end of said channel-like portion for substantially simultaneously viewing of objects through said sighting tubes and reading on said compass through said channel.

2. The structure of claim 1 characterized by and including a lens at the rearward end of said channel.

References Cited
UNITED STATES PATENTS

| | | | |
|---|---|---|---|
| 2,880 | 12/1842 | Benton | 33—67 X |
| 219,076 | 9/1879 | Devault | 33—67 |
| 543,122 | 7/1895 | Bergh et al. | |
| 783,897 | 2/1905 | Sanger. | |
| 895,330 | 8/1908 | Bauer. | |
| 916,238 | 3/1909 | Whitney | 33—66 |
| 2,529,764 | 11/1950 | Dufilho | 33—222 |
| 3,184,854 | 5/1965 | Grasse | 33—67 |

ROBERT B. HULL, Primary Examiner

U.S. Cl. X.R.

33—222